Patented Mar. 26, 1935

1,995,957

UNITED STATES PATENT OFFICE 1,995,957

ASPHALTIC COATING COMPOSITION AND MATERIAL COATED THEREWITH

Harold James Barrett, Wilmington, Del., assignor to E. I. du Pont de Nemours & Company, Wilmington, Del., a corporation of Delaware No Drawing. Application January 31, 1931, Serial No. 512,738

15 Claims. (Cl. 134—26)

This invention relates to an improved asphalt varnish and to products coated therewith. More particularly the invention relates to artificial leather comprising fabrics or other flexible sheet material provided with a top coat of the improved asphalt varnish.

Asphalt varnishes, as disclosed in Patent 1,795,199, have been found to be especially valuable as a final coat for materials, such as automobile top materials, which are exposed to the sun and weather. These varnishes have been improved in certain respects by the incorporation of synthetic resins of the oil modified polyhydric alcohol-polybasic acid type, as disclosed in the application of Andrew J. Hemmer, Serial No. 478,549, filed August 28, 1930. I have discovered that these varnishes comprising asphalt and polyhydric alcohol-polybasic acid resins may be further improved, as will more fully appear in the following specification.

This invention has as an object the production of improved asphalt varnishes.

A further object resides in the production of an improved artificial leather or coated fabric, which is especially adapted for use as an automobile top material. Other objects will appear hereinafter.

I have discovered that coatings produced by asphalt varnishes containing polyhydric alcohol-polybasic acid resins are improved with respect to compatibility of the resin with the asphalt, the durability of the coating, and the capability of the coating to retain a high luster for a long period of time, if the component of the resin comprising the reaction product of the polybasic acid with the polyhydric alcohol is kept low, (below 23%), as compared with the resins of the Hemmer application which discloses resins containing higher percentages (23.3% to 40% of polybasic acid glyceride). Whereas these limits are expressed in terms of "polybasic acid" glycerides, they are equally applicable to polybasic acid derivatives of other polyhydric alcohols such as, for example, glycol or pentaerythritol. However, since phthalic acid (or anhydride) is my preferred polybasic acid and glycerol is my preferred polyhydric alcohol, the polybasic acid-polyhydric alcohol constituent of my resin compositions is referred to throughout my specification as "phthalic glyceride" content.

I have further discovered that the improvements referred to are much more marked when rosin or other natural acidic resins, such as kauri or Run Congo, are incorporated into oil modified polyhydric alcohol-polybasic acid resins during the process of their manufacture by substituting the natural resins for a part of the drying or semi-drying oil or corresponding oil acids. I have also found that results comparable to the introduction of the natural acidic resins may be obtained with naphthenic acids. It is to be noted, however, that when the natural acidic resins or naphthenic acids are used as above mentioned, it is not necessary for the attainment of the objects of the invention to keep the phthalic glyceride content of the resin as low as when the natural acidic resins or naphthenic acids are absent. It is apparent, of course, that the rosin, Congo, naphthenic acids, etc., can be previously esterified and added to the reaction mixture in the form of the ester, such as for example rosin glyceride, commonly known as ester gum.

The following examples are illustrative of the methods used in carrying out the invention.

Example 1

| | Parts by weight |
|---|---|
| Petroleum asphalt | 100 |
| Solvent naphtha | 100.49 |
| Resin A (acid No. 15.4) | 20.00 |
| Turpentine | 20.00 |
| Cobalt drier | 0.17 |
| | 240.66 |

The asphalt is heated to 500° F., allowed to cool to 425° F., an equal weight of solvent naphtha is added, and the mixture is stirred until the asphalt is completely dissolved. To this solution is added 40 parts by weight of a 50% solution of resin A in turpentine and 0.65 parts by weight of a cobalt drier solution containing 1.45% cobalt.

Resin A, used in the above composition, was formed from the following ingredients, using the proportions indicated:

| | Parts by weight |
|---|---|
| Glycerol | 11.05 |
| Phthalic anhydride | 7.30 |
| Linseed oil acids | 67.95 |
| Rosin | 13.70 |
| | 100.00 |

Example 2

| | Parts by weight |
|---|---|
| Petroleum asphalt | 100.00 |
| Solvent naphtha | 112.28 |
| Resin A (acid No. 15.4) | 160.00 |
| Turpentine | 160.00 |
| Lead-manganese dried | 4.12 |
| | 536.40 |

The asphalt is heated to 500° F., allowed to cool to 425° F., an equal weight of solvent naphtha is added, and the mixture is stirred until the asphalt is completely dissolved. To this solution is added 320 parts by weight of a 50% solution of resin A in turpentine and 16.4 parts by weight of a drier solution containing 1.47% lead and 0.41% manganese.

Example 3

| | Parts by weight |
|---|---|
| Gilsonite | 100.00 |
| Solvent naphtha | 112.28 |
| Resin B (acid No. 49.2) | 160.00 |
| Turpentine | 160.00 |
| Lead-manganese drier | 4.12 |
| | 536.40 |

The gilsonite is heated to 500° F., allowed to cool to 425° F., an equal weight of solvent naphtha is added, and the mixture is stirred until the gilsonite is completely dissolved. To this solution is added 320 parts by weight of a 50% solution of resin B in turpentine and 16.4 parts by weight of a drier solution containing 1.47% lead and 0.41% manganese.

Resin B, used in the above composition, was formed from the following ingredients, using the proportions indicated:

| | Parts by weight |
|---|---|
| Glycerol | 11.23 |
| Adipic acid | 7.96 |
| Linseed oil acids | 67.25 |
| Rosin | 13.56 |
| | 100.00 |

Example 4

| | Parts by weight |
|---|---|
| Petroleum asphalt | 100.00 |
| Solvent naphtha | 103.07 |
| Resin C (acid No. 64.39) | 40.00 |
| Turpentine | 40.00 |
| Lead-manganese drier | 1.03 |
| | 284.10 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin C in turpentine and 4.1 parts by weight of a drier solution containing 1.47% lead and 0.41% manganese.

Resin C, used in the above composition, was formed from the following ingredients, using the proportions indicated:

| | Parts by weight |
|---|---|
| Glycerol | 11.84 |
| Succinic acid | 7.66 |
| Linseed oil acids | 66.98 |
| Rosin | 13.52 |
| | 100.00 |

Example 5

| | Parts by weight |
|---|---|
| Petroleum asphalt | 100.00 |
| Solvent naphtha | 102.02 |
| Resin D (acid No. 63.80) | 80.00 |
| Turpentine | 80.00 |
| Cobalt drier | 0.68 |
| | 362.70 |

The asphalt is heated to 500° F., allowed to cool to 425° F., an equal weight of solvent naphtha is added, and the mixture is stirred until the asphalt is completely dissolved. To this solution is added 160 parts by weight of a 50% solution of resin D in turpentine and 2.7 parts by weight of a cobalt drier solution containing 1.45% cobalt.

Resin D, used in the above composition, was formed from the following ingredients, using the proportions indicated:

| | Parts by weight |
|---|---|
| Glycol | 10.95 |
| Phthalic anhydride | 7.29 |
| Linseed oil acids | 68.04 |
| Rosin | 13.72 |
| | 100.00 |

Example 6

| | Parts by weight |
|---|---|
| Petroleum asphalt | 100.00 |
| Solvent naphtha | 100.48 |
| Resin E (acid No. 13.53) | 40.00 |
| Turpentine | 40.00 |
| Cobalt drier | 0.17 |
| | 280.65 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin E in turpentine and 0.65 parts by weight of a cobalt drier solution containing 1.45% cobalt.

Resin E, used in the above composition, was formed from the following ingredients, using the proportions indicated:

| | Parts by weight |
|---|---|
| Glycerol | 10.29 |
| Phthalic anhydride | 7.33 |
| Linseed oil acids | 68.29 |
| Kauri | 14.09 |
| | 100.00 |

Example 7

| | Parts by weight |
|---|---|
| Petroleum asphalt | 100.00 |
| Solvent naphtha | 103.69 |
| Resin F (acid No. 27.60) | 48.00 |
| Turpentine | 48.00 |
| Lead-manganese drier | 1.23 |
| | 300.92 |

The asphalt is heated to 500° F., allowed to cool to 425° F., an equal weight of solvent naphtha is added, and the mixture is stirred until the asphalt is completely dissolved. To this solution is added 96 parts by weight of a 50% solution of resin F in turpentine and 4.92 parts by weight of a drier solution containing 1.47% lead and 0.41% manganese.

Resin F, used in the above composition, was formed from the following ingredients, using the proportions indicated:

| | Parts by weight |
|---|---|
| Glycerol | 11.00 |
| Phthalic anhydride | 7.30 |
| Linseed oil acids | 67.97 |
| Naphthenic acids | 13.73 |
| | 100.00 |

Example 8

| | Parts by weight |
|---|---|
| Petroleum asphalt | 100.00 |
| Solvent naphtha | 103.07 |
| Resin G (acid No. 14.48) | 40.00 |
| Turpentine | 40.00 |
| Lead-manganese drier | 1.03 |
| | 284.10 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin G is turpentine and 4.1 parts by weight of a drier solution containing 1.47% lead and 0.41% manganese.

Resin G, used in the above composition, was formed from the following ingredients, using the proportions indicated:

|  | Parts by weight |
|---|---|
| Glycerol | 10.60 |
| Phthalic anhydride | 7.31 |
| Linseed oil acids | 68.14 |
| Run Congo | 13.95 |
|  | 100.00 |

Example 9

|  | Parts by weight |
|---|---|
| Petroleum asphalt | 100.00 |
| Solvent naphtha | 102.02 |
| Resin H (acid No. 22.1) | 80.00 |
| Turpentine | 80.00 |
| Cobalt drier | 0.68 |
|  | 362.70 |

The asphalt is heated to 500° F., allowed to cool to 425° F., an equal weight of solvent naphtha is added, and the mixture is stirred until the asphalt is completely dissolved. To this solution is added 160 parts by weight of a 50% solution of resin H in turpentine and 2.7 parts by weight of a cobalt drier solution containing 1.45% cobalt.

Resin H, used in the above composition, was formed from the following ingredients, used the proportions indicated:

|  | Parts by weight |
|---|---|
| Glycerol | 12.91 |
| Phthalic anhydride | 13.82 |
| Linseed oil acids | 55.98 |
| Rosin | 17.29 |
|  | 100.00 |

Example 10

|  | Parts by weight |
|---|---|
| Gilsonite | 100.00 |
| Solvent naphtha | 106.15 |
| Resin I (acid No. 23.6) | 80.00 |
| Turpentine | 80.00 |
| Lead-manganese drier | 2.05 |
|  | 368.20 |

The gilsonite is heated to 500° F., allowed to cool to 425° F., an equal weight of solvent naphtha is added, and the mixture is stirred until the gilsonite is completely dissolved. To this solution is added 160 parts by weight of a 50% solution of resin I in turpentine and 8.2 parts by weight of a drier solution containing 1.47% lead and 0.41% manganese.

Resin I, used in the above composition, was formed from the following ingredients, using the proportions indicated:

|  | Parts by weight |
|---|---|
| Glycerol | 11.06 |
| Phthalic anhydride | 7.30 |
| Linseed oil acids | 54.35 |
| China wood oil acids | 13.59 |
| Rosin | 13.70 |
|  | 100.00 |

Example 11

|  | Parts by weight |
|---|---|
| Petroleum asphalt | 100.00 |
| Solvent naphtha | 103.07 |
| Resin J (acid No. 21) | 40.00 |
| Turpentine | 40.00 |
| Lead-manganese drier | 1.03 |
|  | 284.10 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin J in turpentine and 4.1 parts by weight of a drier solution containing 1.47% lead and 0.41% manganese.

Resin J, used in the above composition, was formed from the following ingredients, using the proportions indicated:

|  | Parts by weight |
|---|---|
| Glycerol | 6.66 |
| Phthalic anhydride | 7.49 |
| China wood oil acids | 23.29 |
| Deodorized sardine oil | 48.47 |
| Rosin | 14.09 |
|  | 100.00 |

Example 12

|  | Parts by weight |
|---|---|
| Gilsonite | 100.00 |
| Solvent naphtha | 112.28 |
| Resin K (acid No. 27.2) | 160.00 |
| Turpentine | 160.00 |
| Lead-manganese drier | 4.12 |
|  | 536.40 |

The gilsonite is heated to 500° F., allowed to cool to 425° F., an equal weight of solvent naphtha is added, and the mixture is stirred until the gilsonite is completely dissolved. To this solution is added 320 parts by weight of a 50% solution of resin K in turpentine and 16.4 parts by weight of a drier solution containing 1.47% lead and 0.41% manganese.

Resin K, used in the above composition, was formed from the following ingredients, using the proportions indicated:

|  | Parts by weight |
|---|---|
| Glycerol | 6.66 |
| Phthalic anhydride | 7.49 |
| China-wood oil acids | 23.29 |
| Soya bean oil | 48.47 |
| Rosin | 14.09 |
|  | 100.00 |

Example 13

|  | Parts by weight |
|---|---|
| Petroleum asphalt | 100.00 |
| Solvent naphtha | 100.00 |
| Resin A (acid No. 15.4) | 60.00 |
| Turpentine | 60.00 |
|  | 320.00 |

The asphalt is heated to 500° F., allowed to cool to 425° F., an equal weight of solvent naphtha is added, and the mixture is stirred until the asphalt is completely dissolved. To this solution is added 120 parts by weight of a 50% solution of resin A in turpentine.

Example 14

| | Parts by weight |
|---|---|
| Petroleum asphalt | 100.00 |
| Solvent naphtha | 100.00 |
| Resin L (acid No. 24.2) | 40.00 |
| Turpentine | 40.00 |
| | 280.00 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin L in turpentine.

Resin L, used in the above composition, was formed from the following ingredients, using the proportions indicated:

| | Parts by weight |
|---|---|
| Glycerol | 11.05 |
| Phthalic anhydride | 7.30 |
| Linseed oil acids | 45.30 |
| China-wood oil acids | 22.65 |
| Rosin | 13.70 |
| | 100.00 |

Example 15

| | Parts by weight |
|---|---|
| Gilsonite | 100.00 |
| Solvent naphtha | 100.00 |
| Resin M (acid No. 25) | 80.00 |
| Turpentine | 80.00 |
| | 360.00 |

The gilsonite is heated to 500° F., allowed to cool to 425° F., an equal weight of solvent naphtha is added, and the mixture is stirred until the gilsonite is completely dissolved. To this solution is added 160 parts by weight of a 50% solution of resin M in turpentine.

Resin M, used in the above composition, was formed from the following ingredients, using the proportions indicated.

| | Parts by weight |
|---|---|
| Glycerol | 10.17 |
| Phthalic anhydride | 3.65 |
| Linseed oil acids | 81.61 |
| Rosin | 4.57 |
| | 100.00 |

When low phthalic glyceride content of the resin is solely relied upon to produce my improved asphalt varnish, the phthalic glyceride content of the resin may range between about 5% and about 23% by weight of the resin, the remainder of the resin consisting essentially of drying oil acid glycerides. Expressed in terms of its reacting ingredients, the resin may be comprised of the reaction product of from about 1.5% to 14.6% glycerol, 3.5% to 17% phthalic anhydride, the remainder being oil or oil acid of the drying or semi-drying class containing oil acid amounting to from 86% to 69% of the reacting ingredients. In the case of these low phthalic glyceride containing resins, it is preferred to use resins containing about 10% phthalic glyceride and 90% drying oil acid glycerides, these figures corresponding to about 11.31% glycerol, 7.28% phthalic anhydride, and 81.41% drying oil acids.

The incorporation of rosin into the polyhydric alcohol-polybasic acid resin is, as previously noted, an important aid in effecting compatibility between the asphalt and resin and in conferring improved durability of the film yielded by the asphalt varnish. Varnishes that have proved to be most durable have been prepared from resins containing approximately 10% phthalic glyceride, 15% rosin glyceride, and 75% drying oil acid glyceride. These percentages may, however, be varied somewhat, as it is possible to produce excellent asphalt varnishes with resins in which the phthalic glyceride content ranges from 5% to 40% and in which the rosin glyceride varies from 5% to 25%, the drying oil glyceride constituting, in each case, the bulk of the remainder of the resin content. It is to be noted that the total of the phthalic glyceride and rosin glyceride can rise too high, with the result that the resin is so short in oil (deficient in drying oil acid glycerides) that it is no longer satisfactorily compatible with the asphalt. The resin should not, therefore, fall below about 45% drying or semi-drying oil acid glycerides, which corresponds to about 40% drying or semi-drying oil acids. It is to be understood that the glycerides mentioned in this specification refer, not to phthalic glyceride, rosin glyceride, and drying oil acid glycerides, separately, but to synthetic mixed phthalic-rosin-drying oil acid glycerides in which some of the hydroxyl groups of each glycerol molecule have probably been esterified by phthalic anhydride, some by rosin, and some by drying or semi-drying oil acids. Glyceride compositions of my resins are calculated from the batch compositions, that is, from the weights of ingredients charged to the kettle before formation of the resin. Thus, the glyceride compositions do not take cognizance of small amounts of ingredients which may be volatilized during preparation of the resins. This discrepancy, however, is quite small and is entirely overbalanced by the convenience of being able to reason in terms of "solid" and "softening" glyceride ingredient ratios in the resin. The preferred percentages of the rosin-containing resin referred to above, but expressed in terms of the reacting ingredients which produce the resinous reaction product, termed herein as a polyhydric alcohol-polybasic acid resin, are approximately as follows: 11% glycerol, 7.3% phthalic anhydride, 13.7% rosin, and 68% drying or semi-drying oil acids or the equivalent amount of oil. Of course, if oil is used instead of oil acids in this formula less glycerol should be used. In this case only about 4% of glycerol is necessary if drying oil is used.

The limits of these compositions, expressed in terms of their reacting ingredients, within which improved asphalt varnishes may be made are about as follows: glycerol from about 1.5% to 17.5%, phthalic anhydride from 3.5% to 29%, rosin from 4.5% to 23%, the remainder of the resin in each instance being comprised of drying or semi-drying oil acids or the corresponding drying or semi-drying oils, together with small amounts of other modifying ingredients.

The improvement in compatibility with asphalt of polyhydric alcohol-polybasic acid resins in which low phthalic glyceride content alone is relied upon to produce the increased compatibility, as well as the further increase in compatibility resulting from the presence of rosin glyceride in the resin, is evidenced by the acceptable gallon lengths of the resin that may be used with the asphalt. A "gallon" oil length, as used in the varnish trade, designates a gallon of oil per 100 pounds of gum. By weight, this is generally about eight pounds of oil to 100 pounds of gum. The term "gallon" or "gallon length", as used herein, designates eight pounds of oil modified polyhydric alcohol-polybasic acid resin per 100 pounds of asphalt. The term "acceptable gallon lengths" refers to the maximum number of gallons of resin that are compatible with, and will produce a homogeneous mixture with 100 pounds of asphalt. Considering the acceptable gallon lengths which may be realized with resins of low phthalic glyceride content containing no rosin glyceride, I have made acceptable 40 gallon varnishes (320 lbs. of resin to 100 pounds of asphalt) with resins containing 5% phthalic glyceride and 95% linseed oil acid glycerides without the use of a blending agent, whereas with resins containing 23% phthalic glyceride content and 77% linseed oil acid glycerides, varnishes above twenty gallons are not acceptable. The presence of blending agents, such as lead and manganese resinates, increases the compatibility considerably, as will be apparent from the fact that resins of 5%, 10%, and 15% phthalic glyceride content will, with the aid of these blending agents, yield compatible varnishes of 75, 40, and 40 gallons, respectively, whereas without the use of blending agents the acceptable gallon lengths are 40, 25 and 25 gallons, respectively.

As the phthalic glyceride content rises above about 23%, the acceptable gallon lengths and the durability of the asphalt-modified polyhydric alcohol-polybasic acid resin systems diminish. Thus, resins containing 23.3% phthalic glyceride and 76.7% linseed oil acid glycerides, and resins containing 37.62% phthalic glyceride and 62.38% linseed oil glycerides, yield acceptable gallon lengths not greater than 20, with or without the use of a blending agent. Furthermore, these gallon lengths of resins having high phthalic glyceride content are possible only when the resin has a relatively high acid number. With lower acid numbers, the compatibility of the resins with asphalt is still further decreased.

The incorporation of rosin into the oil modified polyhydric alcohol-polybasic acid resin effects a still further increase in compatibility between the resin and asphalt. A resin containing 5% phthalic glyceride, 5% rosin glyceride, and 90% linseed oil acid glycerides having an acid number of 25 will yield a 40 gallon varnish without a blending agent and a 100 gallon varnish with a lead-manganese resinate blending agent, whereas corresponding resins which do not contain rosin glyceride are not compatible with asphalt above 25 gallons without a blending agent and above 40 gallons with a lead-manganese resinate blending agent. The effect of the substitution of rosin glyceride for a part of the phthalic glyceride in the resin may further be observed from the fact that a resin containing 19% phthalic glyceride, 19% rosin glyceride and 62% linseed oil acid glycerides, (this resin resulting from the substitution of about 19% rosin glyceride in the previously mentioned resin containing 37.62% phthalic anhydride) yields a 35 gallon asphalt varnish without a blending agent and a 40 gallon varnish with a blending agent, as compared to the 20 gallon varnishes produced from the above mentioned resin composed of 37.62% phthalic glyceride and 62.38% linseed oil acid glycerides. The resin of the preferred rosin glyceride content, i. e., 15% rosin glyceride, 10% phthalic glyceride, and 75% linseed oil acid glycerides, yields a 35 gallon varnish without a blending agent and a 40 gallon varnish with a blending agent, as compared to 20 gallon lengths produced by the previously mentioned resin containing 23.3% phthalic glyceride and 76.7% linseed oil acid glycerides. The preferred resin containing rosin glyceride is somewhat more compatible with the asphalt than the preferred low phthalic glyceride resin, (10% phthalic glyceride and 90% linseed oil acid glycerides) containing no rosin, as will be noted from the fact that the latter resin yields varnishes of 25 gallon length without a blending agent as compared with the 35 gallon varnishes produced from the preferred resin containing rosin glyceride. In general, the statement may be made that the higher the phthalic glyceride content, the more rosin will be necessary in order to effect improved compatibility with the asphalt. In most cases systems containing rosin modified resins of relatively high phthalic glyceride content pass thru a minimum point of compatibility, which makes it difficult to define acceptable gallon lengths. Thus, a resin containing 40% phthalic glyceride, 15% rosin, and 45% linseed oil acid glycerides, acid number 25.5, yields an acceptable 30 gallon asphalt varnish, but the 10 gallon varnishes are very dull. The system appears to pass thru a minimum in compatibility at 10 gallons length.

The resins with which the present invention is concerned, as will be apparent from the increased gallon lengths capable of being produced, are markedly more compatible with asphalt than are the polyhydric alcohol-polybasic acid resins previously used in making asphalt varnishes. The higher gallon length varnishes, however, sometimes exhibit undesirable characteristics such as poor durability, tackiness, dullness, and the development of a blue color in the film. It is to be understood, therefore, that the present invention resides, not in the production of asphalt varnishes of exceptional gallon length of resin, but in my discovery that the resins of low phthalic glyceride content and the rosin modified resins herein described produce asphalt varnishes of improved durability up to 20 gallons in resin length. I have found that in asphalt varnishes of not more than 20 gallons resin length the durability and compatibility with asphalt go hand in hand, and, as previously pointed out, the resins included in the present invention are characterized by exceptional compatibility with asphalt.

The durability of the films yielded by the varnish, as well as the acceptable gallon lengths possible, will vary somewhat for asphalts from different sources. I prefer to use a petroleum residue asphalt which has been steam refined, as distinguished from petroleum residue asphalt which has been refined by other methods, as for instance, by blowing with air. I have found that the most durable varnishes are produced from steam refined petroleum residue asphalt. The steam refined petroleum residue asphalt should preferably have a softening point between the approximate range of 150–250° F., as determined by the ball and ring method described in A. S. T. M. standards, 1921, page 944, under the serial designation D-36-21. It is desirable, furthermore, that the steam refined petroleum residue asphalt have as high a melting point as possible within the range given, in order to obtain with this type of asphalt the maximum durability and retention of luster on exposure to the weather. The advantages inherent in the practice of the present invention may, however, be obtained thru the use of other asphalts such as gilsonite and other bitumens.

As will be understood by those skilled in the art, polyhydric alcohols and polybasic acids other than those mentioned may be used in making these resins. These resins may be made with any of the suitable drying oil acids in the manner indicated in the examples, or they may be made with the drying oils themselves, such as linseed, China-wood, or perilla oils, by first heating the glycerol and oil together and then heating the glyceride so formed with the phthalic anhydride. It is intended, therefore, that the term "oil" shall refer to drying oils or drying oil acids, and that the term "oil modified polyhydric alcohol-polybasic acid resin" as used in the claims shall refer to resins made with either the drying oils or the equivalent amount of drying oil acids.

A satisfactory method consists in making each glyceride or any combination of the glycerides mentioned above, separately, and then blending them together, if desired, before reaction with the phthalic anhydride or similar constituent.

As indicated above, an example is given in which a mixture of a copolymer of vinyl chloride and vinyl acetate is used in proportion of polyhydric alcohol-polybasic acid resin modified with drying oils or drying oil acids; and in each case, an example is given, however, the resins obtained should be of a fairly low acid number. Ordinarily, when these resins are used in proportion of more than 40% of a mixture, they should be of a relatively low acid number, compatible with the asphalts and resins of higher acid number.

Other solvents, such as alcohol, may be used in these applications and may be added to the examples.

The drying up of these asphalt finishes can usually be effected by air-drying, but baking is preferred where maximum durability is desired, or where close adherence is desired.

The coating composition of my disclosure is of a particular utility as a top coating of motor vehicles which are exposed to extreme weather conditions. These compositions are especially valuable because of their uniform color, durability, resistance to deterioration, and capability of retaining a lustrous appearance for a long time.

When applying the composition to the automobile or other material, usually there are other materials, frequently in excess of systems or intermediate systems, on the surface, and it is simple to form, for instance, a varnish film such as the composition especially devised for use under a rubber such as air-dried or baked at a suitable temperature, or a sufficient time to cause a thorough fusion of the varnish film. Experience has confirmed that the coating is substantially hard and flexible, reasonably soft, and possesses such pliability to permit direct bending of the coating without cracking. The temperature and time of cure depends upon the type of varnish composition used, especially the kind of
accelerator used. As a rule, the temperature will lie between 240 to 275° F., and the time of cure will be from 30 minutes to 3 hours. Usually, the composition when applied over rubber is baked for two and one-half hours at 250° F. It is preferred, however, because of the greater flexibility and better retention of gloss obtained, first to apply a suitable intermediate varnish coating, such as the varnish exemplified below:

*Example 16*

| | Parts by weight |
|---|---|
| Carbon black | 2.5 |
| Bodied China-wood oil with drier | 20.0 |
| Bodied linseed oil and drier | 20.0 |
| Petroleum residue asphalt | 3.5 |
| Turpentine substitute | 54.0 |
| | 100.0 |

This intermediate coat may be "air-dried", if desired, that is, dried at room temperature, but it is more advantageous from the cost standpoint to use a process of baking at a suitable temperature below that of the containing temperature of the final finish coat. Usually, the first coat varnish as described above is baked at a temperature of between 250° F. and 275° F. for a medium time, after which it is applied with the finish varnish and finish by baking at a temperature of about 250° F. If other suitable resins are inadequate to withstand the combination of the above mixture, such as a suitable asphalt varnish, it may be used. It does not need to contain other resins. The undercoat is of such extent that a body asphalt is expanded from the asphalt contents of the varnish at higher temperatures so that the coat at the surface at a temperature where a second coat of undercoating is to be applied is quite preferred to intermediate resin compositions, rather than residue asphalts. Thus, previously undercoat of varnish, which has a body of such depth and thickness below temperatures of use, at temperatures however, when inadequate for various undercoatings of the under-layer, should dry rapidly, an example, also an oil varnish between 200° F. and 250° F., and preferred. Among the resin asphalts, those of a varnish coat of a hydride coat of black at about temperature, may by an enforcement of intermediate hardness at a rate of relative toughness.

It is, however, essential to the advantageous feature of simplifying the intermediate varnish coat above this, the varnishing, at a position of the undermining in a complete drying of the solid hydrocarbons and, at the same temperature at which the finish coat of asphalt varnish is to be applied. This practice is recommended that undercoats are delayed in complete process, and it is important that this undercoat of baking or cooling of the undercoat of resin coat should be curing into it in a suitable manner such that the resin-filled matter will thus yield ends should be removed by the least amount which induce a creation of a little cleft in undermining the temperature of an insufficient time produces the finished coat and of a properly qualified formation of the asphalt varnish. However, it is not essential to the practice of my discovery, as processes which involve a staining of the final asphalt coating of a two-coat system is to be used to obtained, which is a two-coat system for which the final coat is a baked varnish in which constituents compose a material of the resin asphalt varnish.

My improved asphalt coating compositions are also useful for the protection of similar materials by diminishing a contact of materials harmful to rubber, such as in as nitrocellulose lacquers, and these in our dates is found. This is especially used sheet material" covers the fabrics such as paper or cloth coated with a layer of material such as rubber or pyroxylin by spraying, spreading, calendering, or by other known methods of application.

Pigments, such as carbon black and asbestine may be added to the varnishes herein disclosed and such addition generally results in improved durability.

As many apparently widely different embodiments of this invention may be made without departing from the spirit and scope thereof, it is to be understood that I do not limit myself to the specific embodiments thereof except as defined in the appended claims.

I claim:

1. A coating composition comprising asphalt, an organic solvent, and a polyhydric alcohol-polybasic acid resin the composition of which may be calculated as from 5% up to 23% polybasic acid ester, the remainder being fatty oil acid ester, said resin comprising the reaction product of a polyhydric alcohol, a polybasic acid and a modifying agent selected from the class consisting of fatty oils and fatty oil acids, the proportion of said resin to asphalt present in the composition being substantially less than the maximum proportion of said resin to asphalt which is capable of forming a homogeneous blend.

2. The composition set forth in claim 1 in which the polyhydric alcohol is glycerol, the polybasic acid is phthalic anhydride, and the fatty oil acids are linseed oil acids.

3. A coating composition comprising asphalt, an organic solvent and a glyceryl phthalate resin the composition of which may be calculated as about 10% glyceryl triphthalate and about 90% oil fatty acid glycerides, said resin comprising the reaction product of glycerol, phthalic anhydride, and a modifying agent selected from the class consisting of fatty oils and fatty oil acids, the proportion of said resin to asphalt present in the composition being substantially less than the maximum proportion of said resin to asphalt which is capable of forming a homogeneous blend.

4. A coating composition comprising asphalt, an organic solvent, and a polyhydric alcohol-polybasic acid resin comprising the reaction product of a polyhydric alcohol, a polybasic acid, a modifying agent selected from the class consisting of fatty oil and fatty oil acids, and an additional modifying agent selected from the class consisting of resinic acid and naphthenic acids, the composition of said resin being calculated as from 5% to 40% polybasic acid ester, the remainder being fatty oil acid ester and the ester of said additional modifying agent, the fatty oil acid ester predominating, the proportion of said resin to asphalt present in the composition being substantially less than the maximum proportion of said resin to asphalt which is capable of forming a homogeneous blend.

5. The composition set forth in claim 4 in which the polyhydric alcohol is glycerol, the polybasic acid is phthalic anhydride, the fatty oil acids are linseed oil acids, and the resinic acid is rosin.

6. A coating composition comprising asphalt, an organic solvent, and a polyhydric alcohol-polybasic acid resin comprising the reaction product of a polyhydric alcohol, a polybasic acid, a resinic acid, and a modifying agent selected from the class consisting of fatty oils and fatty oil acids, said resin being one which may be calculated as from 5% to 40% polybasic acid ester, from 5% to 25% resinic acid ester, and the remainder being fatty oil acid ester, the proportion of said resin to asphalt present in the composition being substantially less than the maximum proportion of said resin to asphalt which is capable of forming a homogeneous blend.

7. The composition set forth in claim 6 in which the polyhydric alcohol is glycerol, the polybasic acid is phthalic anhydride, the fatty oil acids are linseed oil acids, and the resinic acid is rosin.

8. A coating composition comprising an organic solvent, asphalt, and an oil modified polyhydric alcohol-polybasic acid resin comprised of the reaction product of a polyhydric alcohol, a polybasic acid, a natural acidic resin, and a modifying agent selected from the class consisting of drying oils, semi-drying oils, drying oil acids, and semi-drying oil acids, said resin being a mixed ester which may be calculated as approximately 10% phthalic glyceride, 15% rosin glyceride, and 75% drying oil acid glyceride, the proportion of said resin to asphalt present in the composition being substantially less than the maximum proportion of said resin to asphalt which is capable of forming a homogeneous blend.

9. As an article of manufacture a flexible fabric sheeting having a final coat of dried varnish comprising asphalt and a polyhydric alcohol-polybasic acid resin the composition of which may be calculated as from 5% to 23% polybasic acid ester, the remainder being fatty oil acid ester, said resin comprising the reaction product of a polyhydric alcohol, a polybasic acid and a modifying agent selected from the class consisting of fatty oils and fatty oil acids, the proportion of said resin to asphalt present in the composition being substantially less than the maximum proportion of said resin to asphalt which is capable of forming a homogeneous blend.

10. The article set forth in claim 8 in which the polyhydric alcohol is glycerol, the polybasic acid is phthalic anhydride, and the fatty oil acids are linseed oil acids.

11. As an article of manufacture a rubber coated flexible fabric sheeting having a final coat of dried varnish comprising asphalt and a polyhydric alcohol-polybasic acid resin the composition of which may be calculated as from 5% to 40% polybasic acid ester, the remainder being fatty oil acid ester and resinic acid ester, the fatty oil acid ester predominating, said resin comprising the reaction product of a polyhydric alcohol, a polybasic acid, a resinic acid, and a modifying agent selected from the class consisting of fatty oils and fatty oil acids, the proportion of said resin to asphalt present in the composition being substantially less than the maximum proportion of said resin to asphalt which is capable of forming a homogeneous blend.

12. The article set forth in claim 11 in which the polyhydric alcohol is glycerol, the polybasic acid is phthalic anhydride, the fatty oil acids are linseed oil acids, and the resinic acid is rosin.

13. As an article of manufacture a rubber coated flexible fabric sheeting having a final coat of dried varnish comprising asphalt and a polyhydric alcohol-polybasic acid resin comprising the reaction product of a polyhydric alcohol, a polybasic acid, a resinic acid, and a modifying agent selected from the class consisting of fatty oils and fatty oil acids, said resin being one which may be calculated as from 5% to 40% polybasic acid ester, from 5% to 25% resinic acid ester, the remainder being fatty oil acid ester, the proportion of said resin to asphalt present in the composition being substantially less than the maximum proportion of said resin to asphalt which is capable of forming a homogeneous blend.

14. The coating composition set forth in claim 1 in which the resin and asphalt are present in the composition in the proportion of from 20 to 160 pounds of resin per 100 pounds of asphalt.

15. The composition set forth in claim 4 in which the resin and asphalt are present in the composition in the proportion of from 20 to 160 pounds of resin per 100 pounds of asphalt.

HAROLD JAMES BARRETT.